(12) United States Patent
Wilson

(10) Patent No.: X7154
(45) Date of Patent: Jul. 3, 1832

(54) ALARM BELL, FOR TIME PIECES, ALARM CLOCK

(76) Inventor: Robert Wilson

Robert Wilson of Williamsport State of Pennsylvania –

Letters Patent

The schedule referred to in these Letters Patent and making part of the same, containing a description in the words of the said Robert Wilson himself of his improvement in the Alarm, for watches or time pieces Be it known that I Robert Wilson of Williamsport Lycoming County and State of Pennsylvania have made an improvement in the alarm for watches or Time pieces which is described as follows, This alarm consists of the bell, the fly which strikes the clapper, the main spring & Barrel. the main wheel & pinion; the watch wheel and pinion, — The Bell with the clapper is made in the common shape, of a small size and supported by a bent wire from the platform or foundation, — The fly wheel which strikes the clapper — this consists of an axle or shaft made of iron or steel about six inches long about 1/8 of an inch in diameter and turns on pivots at the ends, at about one inch from one end is a pinion with about 7 leaves cut out of the said axle and at about two thirds of the length of the axle is placed on the same an oblong frame of Metal about 1/2 inch long by one inch wide at a convenient distance to strike the clapper. — The main spring and barrel — The main spring is made of steel bent like a trap spring about 5 inches long, one arm of the spring is about half an inch longer than the other to project over the axle of the barrel. The barrel is about 1/2 inch diameter turning with the axle on pivots, The cord from the main spring wind on a fusee on the axle of this barrel. The main wheel & pinion — The main wheel is about 3 inches in diameter filled with teeth on its periphery. When in motion it turns with the axle by means of a click & ratchet wheel when winding up the axle turns but not the wheel, The teeth of the wheel mesh into the pinion on the
fly. — A cylinder with the ratchet wheel are made fast to the
axle of the main wheel, The cord from the drum winds and unwinds
on the cylinder A stop for winding is placed on the outside of the
post; — The watch wheel and pinion. The watch wheel is about
1½ inch in diameter with teeth around its periphery — It works
into a pinion turning with the axle when in motion, but the
pinion turns on the axle when setting, A pin for letting off the
fly is placed on the watch wheel at about 3/4 inches from the center
A Click is made fast to the pinion and a ratchet fast on the axle
on which the pinion works for setting the alarm to any particular hour
The number of teeth in the wheel must be twelve times as great
as those on the pinion, — A catch is placed on the post of the
watch wheel by a screw, about 1/4 inch from the end which strikes
on the arm from the fly. the other end extending to the pin on the
watch wheel. and against which it strikes
A watch face is placed on the post and the axle of the watch
wheel with a hand on it. passes through it for setting the time
Operation, The watch is placed in a holder made for the
purpose and to suit any size watch by means of screw holes,
the time having been determined on at which the alarm is to
be given a crank placed on the axle of the pinion of the watch
wheel is brought in contact, with the minute hand of the
watch which turns the pinion and gives motion to the watch
wheel, the pin on the watch wheel raises on the long end
and depresses the short end of the catch, this lets off the fly,
which strikes the clapper of the bell and the spring being also
disengaged from the drum by the fusee this gives motion to
the main wheel by the cord wound on the cylinder which
turns on the pinion on the axle of the fly. whereby the bell
of the clapper is struck and the alarm given, — The inven
-tion here claimed and which I desire to secure by Letters
Patent consists in the before described Alarm, for watches or time pieces particularly the watch work, fly & main spring — For a further illustration of my invention I refer to the model and drawing of the same deposited in the Patent Office In testimony whereof I have hereunto subscribed my name this 30th day of June 1822

Witnesses.

William P. Elliot
Chas. M. Keller

Robert Wilson

Expd